US005688097A

United States Patent [19]

Becker et al.

[11] Patent Number: 5,688,097

[45] Date of Patent: Nov. 18, 1997

[54] APPARATUS FOR THE LOADING AND UNLOADING OF A FIRING TABLE ARRANGEMENT WITH PRODUCT FOR FIRING

[75] Inventors: Friedherz Becker, Wendelstein; Ralf Binninger; Andreas Bottcher, both of Nuremberg; Johannes Figel, Schwaig; Volker Rieck, Nuremberg; Bernd Stender, Furth, all of Germany

[73] Assignee: Riedhammer GmbH Und Co. KG, Nurnberg, Germany

[21] Appl. No.: 413,964

[22] Filed: Mar. 30, 1995

[30] Foreign Application Priority Data

Mar. 31, 1994 [DE] Germany .......................... 44 11 412.5

[51] Int. Cl.$^{6}$ ...................................................... B65G 1/02

[52] U.S. Cl. .......................... 414/272; 414/331; 414/392; 414/398

[58] Field of Search .................................... 414/157, 159, 414/272, 331, 390–392, 398, 393, 416

[56] References Cited

U.S. PATENT DOCUMENTS

| | | | |
|---|---|---|---|
| 1,490,076 | 4/1924 | Luce | 414/331 |
| 1,565,984 | 12/1925 | Brockenbrough | 414/331 |
| 2,647,645 | 8/1953 | Pierce | 414/331 X |
| 3,055,518 | 9/1962 | Pearne et al. | 414/331 |
| 4,203,696 | 5/1980 | Lindberg | 414/331 |
| 4,295,774 | 10/1981 | Manini et al. | 414/331 |
| 4,474,525 | 10/1984 | Murao | 414/331 |
| 4,867,299 | 9/1989 | Fukuoka et al. | 414/331 X |
| 5,451,132 | 9/1995 | Tokiwa | 414/416 X |
| 5,501,564 | 3/1996 | Doche | 414/416 X |

FOREIGN PATENT DOCUMENTS

| | | | |
|---|---|---|---|
| 585507 | 3/1994 | European Pat. Off. | 414/331 |
| 2587311 | 3/1987 | France | 414/331 |
| 2167031 | 5/1986 | United Kingdom | 414/392 |

*Primary Examiner*—David A. Bucci
*Attorney, Agent, or Firm*—John F. A. Earley; John F. A. Earley, III

[57] ABSTRACT

Apparatus for loading and unloading a firing table arrangement with product for firing, wherein the firing table arrangement comprises on at least one horizontal plane a plurality of rollers having ends disposed at a distance from one another for picking up the product for firing, comprises a supporting structure (20), aligned relative to the firing table arrangement, with two horizontally projecting supporting arms (24) each of them running traversely relative to the rollers, laterally outside the firing table arrangement which are accommodated on the supporting structure (20) so as to be adjustable in height, said supporting arms having inner sides facing one another and a front end, a drive member (26) disposed on the inner side of one supporting arm (24) which, after coupling to the rollers of the firing table arrangement, set them in a rotating movement, and a device disposed on the inner side of the other supporting arm for the rotatable guiding of the rollers of the firing table arrangement. The apparatus may also include a drive member on both supporting arms for coupling to the rollers of the firing table arrangement to set them in rotating motion. The apparatus may also include a plurality of driveable rollers which are adjustable in height perpendicular to the supporting arms.

20 Claims, 5 Drawing Sheets

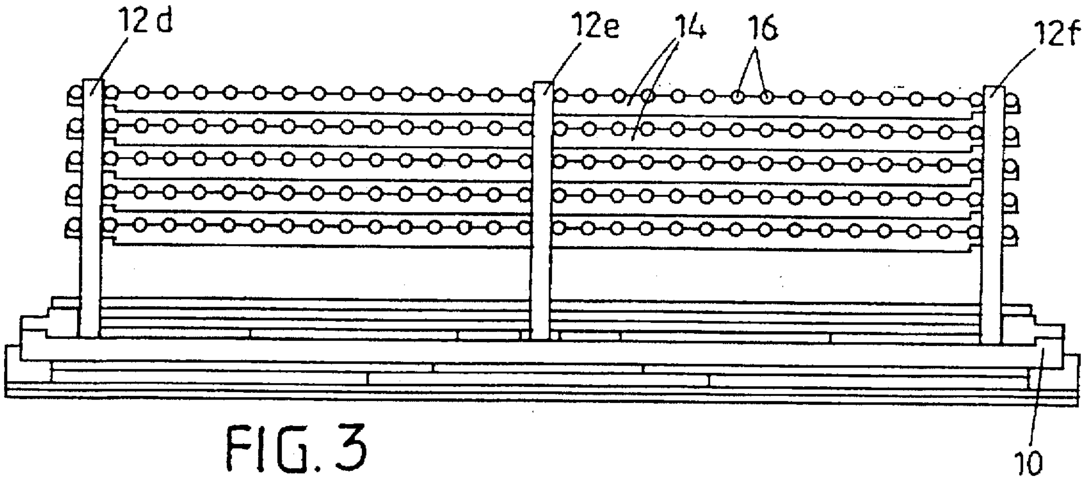
FIG. 3
FIG. 2
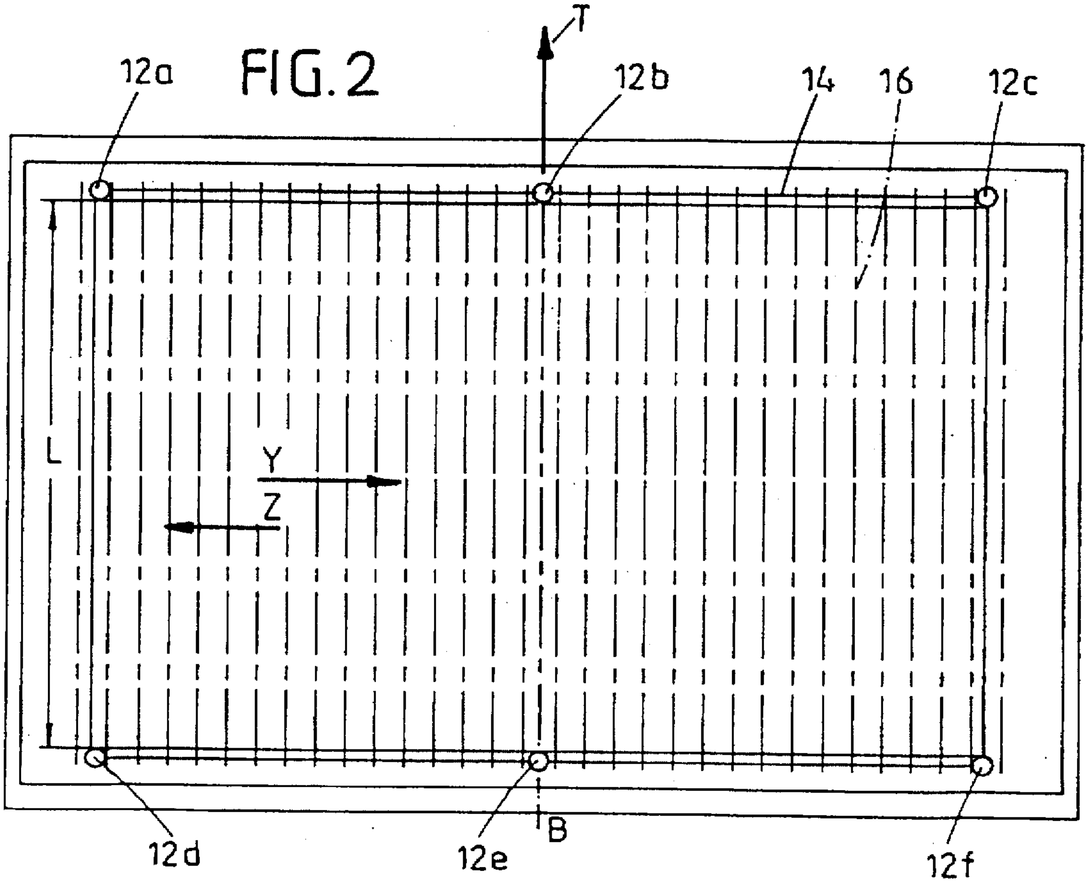

APPARATUS FOR THE LOADING AND UNLOADING OF A FIRING TABLE ARRANGEMENT WITH PRODUCT FOR FIRING

FIELD OF THE INVENTION

The invention relates to an apparatus for the loading and unloading of a firing table arrangement with product for firing.

BACKGROUND OF THE INVENTION

By the term "firing table" there is meant according to the invention first and foremost quite generally a base on which the product for firing can be placed before, during or after the firing process.

Conventionally a kiln car, a plate (a so-called kiln furniture) or a "surface" formed of a plurality of spaced rollers is involved here. The product for firing is placed on the firing table directly or with the interposing of a plate.

The term "product for firing" embraces according to the invention in particular ceramic parts, such as porcelain, sanitary ware etc. The product for firing can be fired in various types of kiln. Of particular importance are tunnel kilns and roller kilns as representatives of continuously operating kilns and hood-type kilns or shuttle kilns as representatives of discontinuously operating kilns.

A firing table for accommodating products for firing can be arranged in various ways.

Various novel arrangements for a firing table have been developed by the applicant's firm recently.

A first type comprises a plurality of support rollers for accommodating the product for firing which are disposed at a distance from one another on at least one horizontal plane and are not driven. Preferably a plurality of planes are disposed above one another, so that a kind of "firing table store" is obtained.

In one form of embodiment the firing table arrangement has the following appearance:

- from a rest, for example the firing table, at least four supports extend at a distance from one another upwards,
- at least two supports are connected to one another by at least one rail in each case,
- at least two rails disposed along a common horizontal plane run parallel at a distance from one another,
- the rails lying opposite and at a distance from one another on a horizontal plane exhibit on their upper edge a large number of bearings, for example depressions,
- at least two bearings (depressions) aligned with one another serve for the picking up of a support roller in each case.

Moreover the individual planes of the firing table arrangement are similar to a roller conveyor in a roller kiln, wherein the rollers are not however driven continuously here, as will be explained in further detail below.

For example, four, six or eight supports, depending on the size of the firing table, are disposed spaced from one another in two rows, wherein the four outer supports define a rectangle which corresponds essentially to the shape and size of the firing table. Partial sub-divisions are also possible.

Accordingly the rails then run in each case between two, three or four supports disposed in a vertical plane and lying opposite one another in pairs on a horizontal plane. Additional supports and rails can however also be provided without difficulty in a vertical plane between the two vertical planes described above.

It is important for the firing table arrangement that the rails spaced in parallel in a horizontal plane are in each case constructed with a large number of seats (depressions) on their upper edges and the depressions of adjacent rails are aligned with one another, so that a support roller can be introduced into each of at least two depressions of adjacent rails.

The spacing of the rollers and hence the spacing of the depressions is determined above all by the size of the smallest part to be fired or of the smallest kiln furniture used.

The rollers must as far as possible not rotate during the transport of the firing table (with arrangement) to a kiln, through the latter or out of the latter, in order that the product for firing cannot fall off inadvertently; on the contrary, a stationary position of the roller during the transport of the firing table is aimed at.

To this end the firing table arrangement can be constructed in such a way that the support rollers run in the transport direction of the kiln car and the loading and unloading accordingly take place perpendicular thereto.

The firing table arrangement described can be constructed with several "levels" one above the other, wherein several rails run above one another and thus form several "storage levels" with the corresponding rails between opposite supports.

SUMMARY OF THE INVENTION

A particular advantage of the new arrangement described for a firing table such as a tunnel kiln car consists in the fact that it becomes possible to move the product for firing through the greatest part of the treatment up to the removal after the firing by means of a transport system which is uniform to the greatest possible extent. Thus the product for firing, for example porcelain, can be conveyed from the drying (after manufacture), through the glazing area, various stores, a loading area and the kiln up to the unloading, after-treatment and packaging areas on roller trains or equipment similar to roller trains, such as the firing table arrangement described.

In an alternative firing table arrangement the product for firing is supported directly or by means of a kiln furniture (plates) on bars, which are supported in turn on rails disposed obliquely thereto, which form part of a frame-type arrangement. The firing table arrangement is similar in the main to that described above. The "storage level" for the product for firing is however formed not by rollers, but by bars.

The object on which the invention is based consists in offering an apparatus for the loading and unloading of a firing table arrangement, in particular of the aforementioned kind, which permits the greatest possible automation and is adaptable to the local conditions of the firing table arrangement in a flexible manner.

The subject matter of the invention is an apparatus for the loading and unloading of a firing table arrangement with product for firing in three alternative forms of embodiment.

In a first form of embodiment the apparatus incorporates the following features:

- a supporting structure with two horizontally projecting supporting arms which are accommodated on the supporting structure so as to be adjustable in height,
- on the inner side of one supporting arm are disposed drive means which, after coupling to the rollers of the firing table arrangement, impart to them a rotating movement, on the inner side of the other supporting arm is disposed a device for the rotatable guiding of the rollers of the firing table arrangement.

This apparatus (A) serves in particular for the loading and unloading of a firing table arrangement with rollers, such as has been described in detail above.

The apparatus is moreover aligned relative to the firing table arrangement in such a way that the supporting arms run transversely relative to the rollers of the firing table arrangement. For the loading and unloading the supporting arms are brought into a position in which the drive means lie directly adjacent opposite the free ends of the rollers. This is achieved in concrete terms by the supporting arms for example first of all being moved away from one another to such a distance that on lowering they are guided laterally close to the firing table arrangement, before they are again moved towards one another at the horizonal level to be loaded with or unloaded of the firing table arrangement. In a similar manner it would however also be possible to first of all move the supporting arms horizontally to such a distance that they lie outside the firing table arrangement, then move them vertically into the desired position and finally move them back again horizontally until the drive organs lie in the above-mentioned position opposite the free ends of the rollers of the firing table arrangement.

Thereafter the drive means are coupled to the free roller ends, as will be described in greater detail below, and in so doing set in a rotating movement, while the opposite roller ends are simply guided (in kilter) by means of a device disposed on the other supporting arm.

In this way a kind of "transport path" is constructed along the rollers, by means of which—depending on the direction of rotation—product for firing (with or without kiln furniture) can be supplied or removed.

It is of advantage for the coupling or guiding of the roller ends that the latter project freely.

If the corresponding level of the firing table arrangement has been loaded or unloaded, a decoupling of the drive means or guiding device from the rollers takes place again the other way round, so that "static conditions" are then obtained again and the product for firing is reliably supported.

According to one form of embodiment the apparatus can be constructed in such a way or controlled in such a way that the rollers are lifted slightly out of their respective seats prior to the initiation of the rotating movement, in order to minimize roller wear.

An alternative form of embodiment (apparatus B) for the same firing table arrangement differs only in that both supporting arms are constructed with drive means and accordingly a coupling of the drive means to the roller ends takes place at both ends, the drive preferably being synchronous.

The form of embodiment C differs from the two above-mentioned variants in particular in that a firing table arrangement is to be loaded and unloaded in which the product for firing is supported not on rollers, but on bars, so that rollers now run between the supporting arms, in a kinematic U-turn, as it were, compared with the aforementioned forms of embodiment.

The apparatus (C) possesses the following features in concrete terms:

a supporting structure with at least two horizontally projecting supporting arms running transversely to the bars of the firing table arrangement and which are accommodated on the supporting structure so as to be adjustable in height, between the supporting arms run spaced from one another a plurality of driveable rollers which are adjustable in height perpendicular to the supporting arms.

In this form of embodiment the supporting arms are always moved horizontally below the level to be loaded or unloaded of the firing table arrangement from a region outside the firing table arrangement. For the loading or unloading the rollers running between the supporting arms are then lifted to a distance such that—depending on the orientation of the bars for accommodating the kiln furniture and the product for firing—they raise slightly the (at least two) bars on which the product for firing and/or the kiln furniture are supported, or the kiln furniture together with the product for firing directly, and by virtue of their rotation thus move the bars (together with the product for firing or the kiln furniture) or kiln furniture (together with product for firing) out of the firing table arrangement or introduce them into the latter. In the last-mentioned case there takes place subsequently for the positioning of the bars or kiln furniture a lowering of the rollers, so that the bars/kiln furniture come to rest on matching holding devices of the firing table arrangement.

The form of embodiment C can also be constructed in such a way that conveyor belts run around the rollers. The bars or a plate, on which the product for firing is supported, are moreover transported by means of the conveyor belts.

In these forms of embodiment it is even possible to work with only one supporting arm, which picks up and guides the rollers.

It is true for all the forms of embodiment that the supporting arms, together with their vertical adjustability, can in addition be moveable along a horizontal plane, for example in order to guide the supporting arms between or close to a horizontal plane of the firing table arrangement.

In the case of the two forms of embodiment first mentioned (A, B) it is of advantage if the supporting arms can be moved towards one another and away from one another.

For the construction of the drive means according to the forms of embodiment A and B the invention offers various problem solutions. The drive means can consist of a large number of driveable wheels which are disposed behind one another in the longitudinal direction of the respective supporting arm and the spacing between two adjacent wheels is then proportioned for the rotatable picking up of a corresponding roller of the firing table arrangement. In this case the transmission of the torque from the wheels onto the rollers takes place by raising of the supporting arms.

In another form of embodiment the drive means consist of a large number of rotatable organs which are constructed in such a way that after placing on the free ends of the rollers of the firing table arrangement they transmit their rotating movement to the respective roller.

In this case the supporting arms can be guided against the corresponding roller ends by displacement in a horizontal direction (towards one another).

In the simplest case the organs consist of discs 50 as seen in FIGS. 6*a* and 6*b*, so that the torque transmission takes place by pure static friction. In addition however the organs can also be formed from bushes 52 as seen in FIGS. 7*a* and 7*b* which can be attached to the free ends of the rollers with frictional connection. Bayonet-type or pin-type transmission elements 54 as seen in FIGS. 8*a* and 8*b* can be provided additionally between the organs and the roller ends.

If the drive of the rollers of the firing table arrangement takes place on only one side (apparatus A), there has to be provided at the opposite roller ends only one device for the rotatable guiding, which can once again consist of wheels which are disposed in the longitudinal direction of the respective supporting arm, wherein the spacing between two adjacent wheels is proportioned so that the corresponding roller (the roller end) can be supported there.

The drive of the rollers preferably takes place by motor. It can be so constructed that the rollers are driven individually, in groups or in common.

In order to automate also the feeding to the firing table arrangement or the collection of the product for firing out of the firing table arrangement, a further form of embodiment provides the assignment to the supporting structure of a store for picking up the product for firing in a plurality of horizontal planes. According to a further optimization it is proposed to connect a height-adjustable feeding and removal device for the product for firing to the apparatus, which runs away from the end of the supporting arms, so that a direct delivery of product can take place. In this form of embodiment the delivery end is therefore always connected to the supporting arms, while the other end region of the feeding and removal device can be constructed adjustable in height. For the charging of the uppermost level of the firing table arrangement the device can then run for example obliquely upwards, while in the case of a central level of the firing table arrangement a horizontal feeding or removal takes place and in the case of the lowest level of the firing table arrangement the device is inclined downwards. In the simplest case the feeding and removal device consists of a conveyor belt or a roller train.

A particular advantage of all the forms of embodiment consists in the fact they can also be retro-fitted to existing plants and require only a small amount of mechanical work.

Whereas a firing table or firing table arrangement has been charged mainly by hand to date, in particular if parts with complicated shapes such as cutlery are involved, the apparatus according to the invention permits a fully automatic loading and unloading of a kiln car or a roller train for a roller kiln.

Further features of the invention follow from the features of the sub-claims and also from the other application documents.

The invention will be explained in detail below by means of an embodiment. There is shown—diagrammatically in each case—in

BRIEF DESCRIPTION OF THE DRAWINGS

FIG. 2: a view onto the firing table arrangement according to FIG. 1,

FIG. 3: a view of the firing table arrangement from the front,

DETAILED DESCRIPTION OF THE INVENTION

In order to illustrate the method of operation of the apparatus according to the invention, the firing table arrangement will first be described.

According to the figures a total of 6 supports **12*a–f* project vertically upwards from a firing table 10. The supports 12*a–c* are, like the supports 12*d–f*, each disposed in a vertical plane. The spacing of the supports 12*a,d* or 12*c,f* is the same (and corresponds roughly to the length L of the kiln car 10). Likewise the spacing of the supports 12*a,c* and 12*d–f* is the same (and corresponds roughly to the width B of the kiln car 10). The corner supports 12*a,c,d*** and *f* thus span between them a rectangular.

Figure 1:
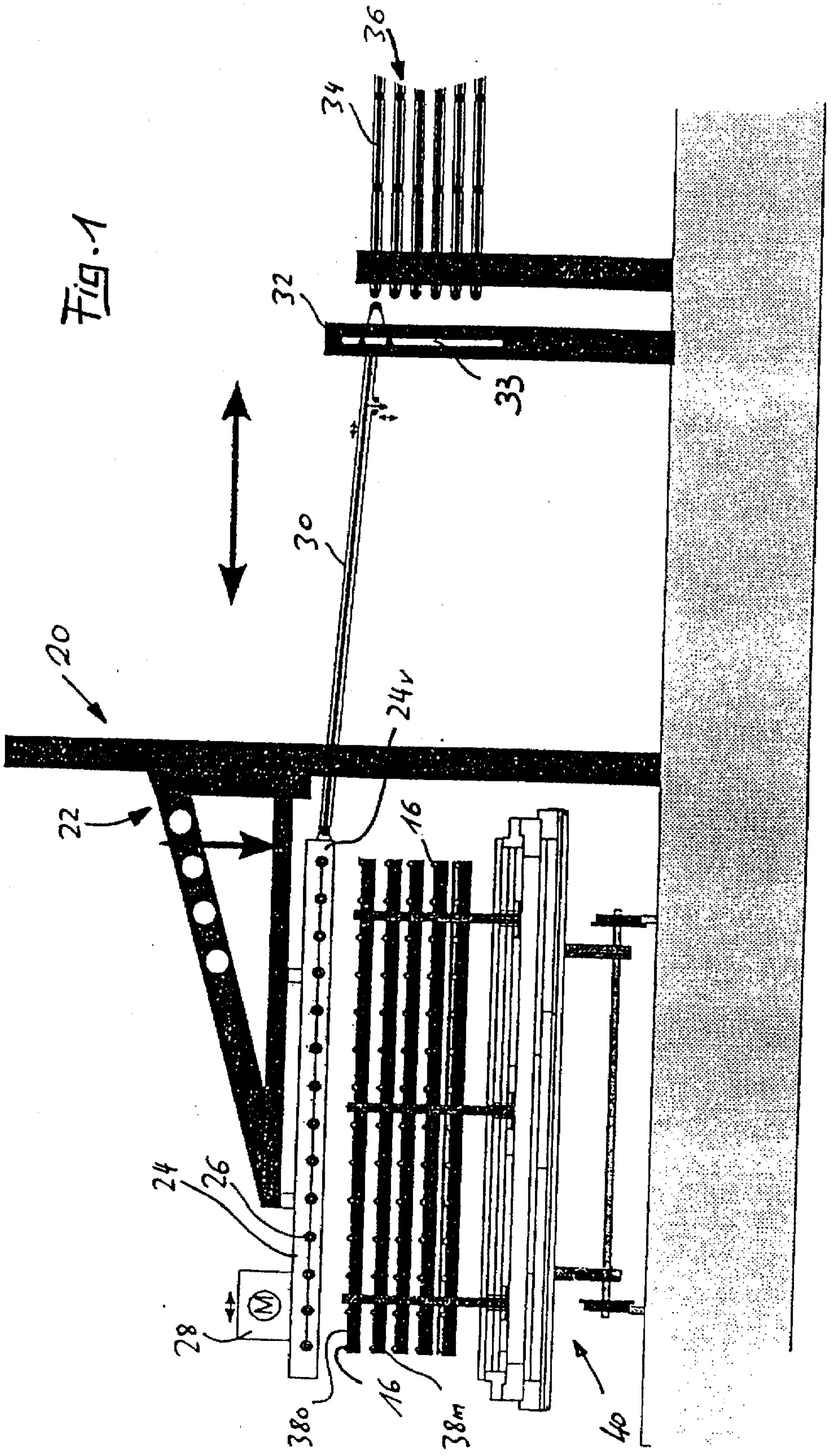
FIG. 1: a side view of an apparatus according to the invention of type B.
Figure 4:
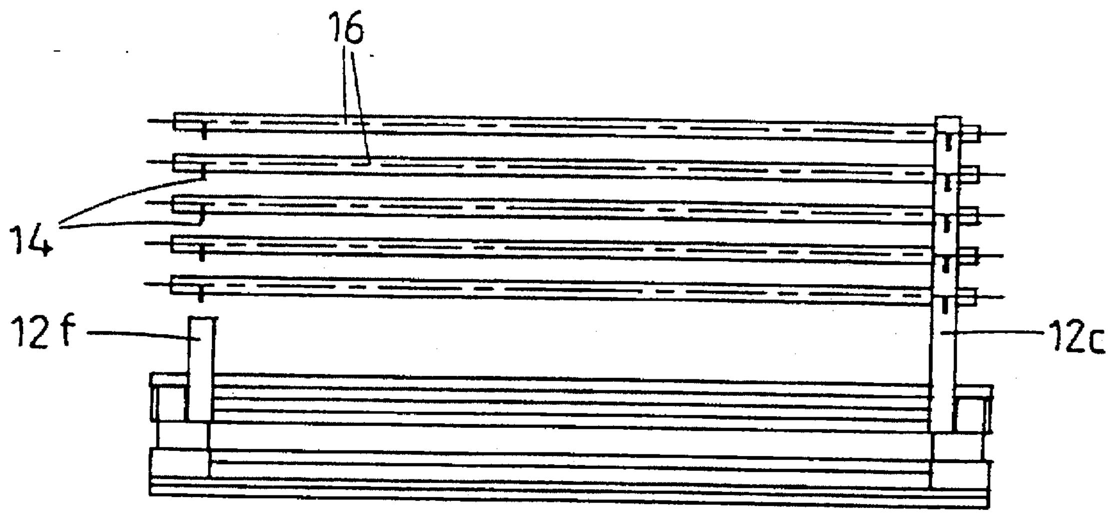
FIG. 4: a view of the firing table arrangement from the side.
Figure 5:
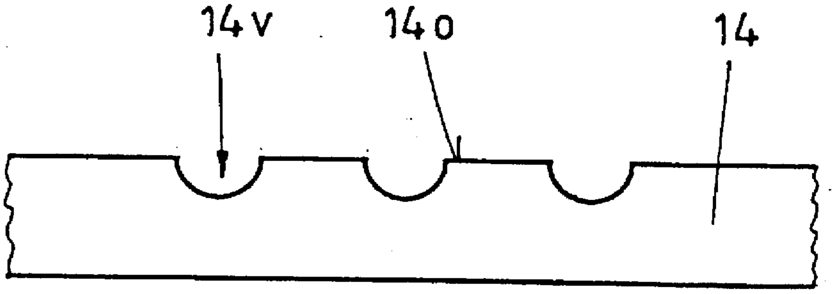
FIG. 5: a side view of a rail of the firing table arrangement.
Figure 6A:
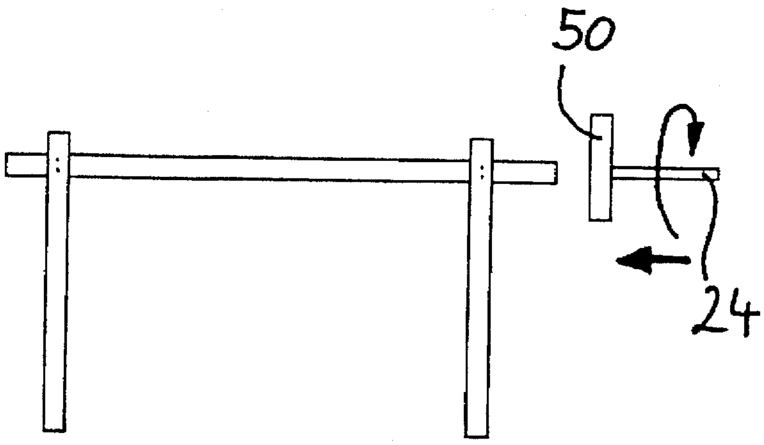
FIGS. 6*a* and 6*b*: a side view of an embodiment of the invention wherein the drive means comprises a large number of rotatable discs.
Figure 6B:
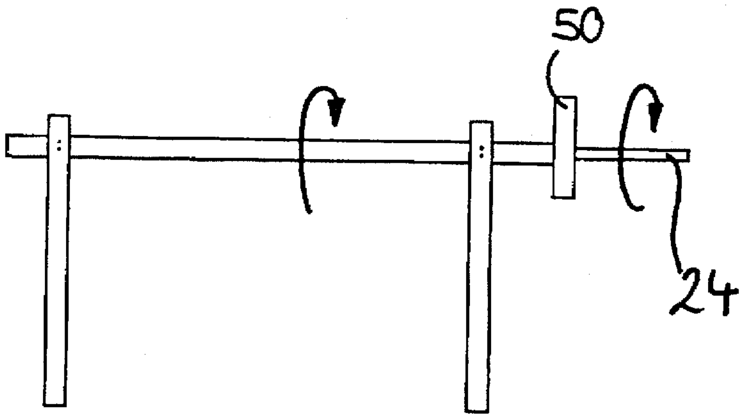
Figure 7A:
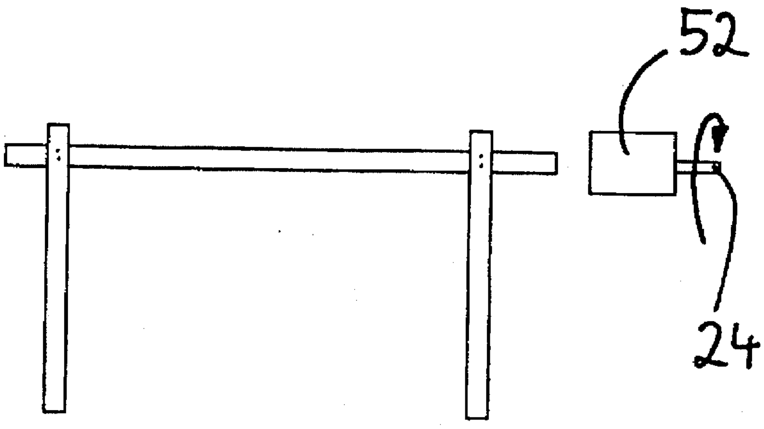
FIGS. 7*a* and 7*b*: a side view of an embodiment of the invention wherein the drive means comprises rotatable bushes.
Figure 7B:
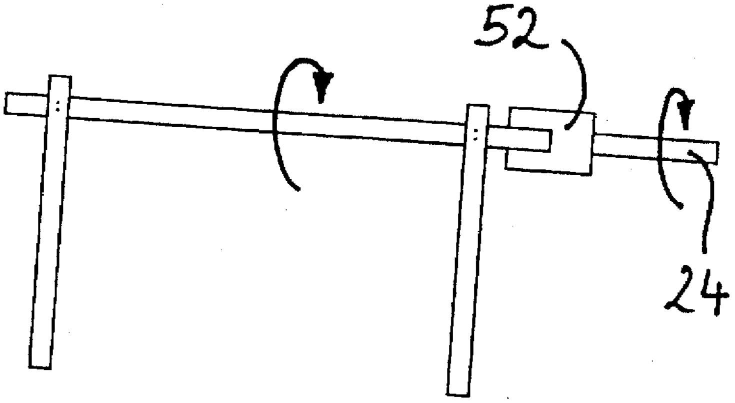
Figure 8A:
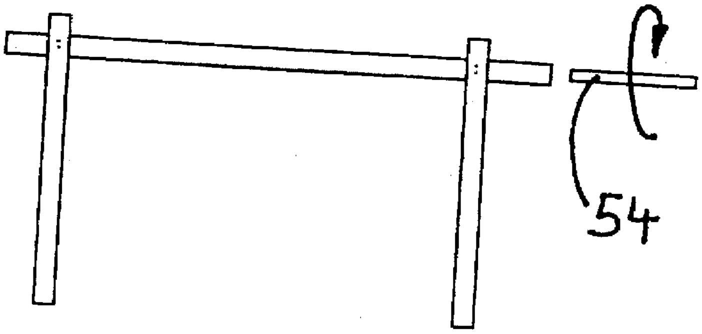
FIGS. 8*a* and 8*b*: a side view of an embodiment wherein the drive means comprises rotatable pins.
Figure 8B:
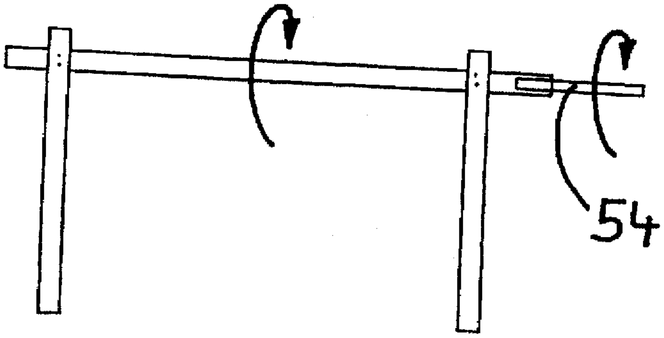

The figures, in particular FIG. 3, also show the rails 14 running between the supports **12*a–c* and 12*d–f*, the depressions 14*v* on the upper edge 14*o* of said rails 14 being most easily visible in FIG. 5**.

The rails 14 are connected firmly to the supports 12, either by corresponding connection means, such as pins, by gluing or similar. A one-piece construction of rails and supports is also possible in principle.

The supports and rails can in principle have any cross-sections and consist of the most varied materials. The aim is always to require as little mass as possible, in order to have to heat up as few kiln furniture as possible. On the other hand the mechanical stability must be sufficient. Materials based on SiC have proved effective.

It can also be seen from the figures that there lie in each of the depressions **14*v*, which lie opposite one another in pairs, support rollers 16, which are aligned in the transport direction of the kiln car (arrow T in FIG. 2) and in addition project at their front ends beyond the rails 14**.

In accordance with the above description of loading and unloading of the firing table arrangement the latter takes place here perpendicular to the transport direction T of the kiln car (arrow Z-loading and Y-unloading in FIG. 2).

The apparatus for the loading and unloading of the firing table arrangement according to FIGS. 1 to 8 incorporates a supporting structure 20 to which a tie-bar 22 is articulated so as to be adjustable in height, from which two horizontally spaced supporting arms 24 project, on whose inner surface a large number of wheels 26 are disposed spaced relative to one another, which are driven in common by a motor 28. The size and spacing of the wheels 26 are shown only diagrammatically here.

To the front end **24*v* of the supporting arms 24 there is connected a conveyor belt 30 which is guided along a rail 32 so as to be vertically adjustable (at 33**).

There is assigned to the conveyor belt 30 a store 34 which comprises a plurality of stores 36 on which the product for firing is supported on kiln furniture (plates), which for the sake of greater clarity is not shown here.

In order that the uppermost level 380, formed by the support rollers 16, of the firing table arrangement may be charged, the product for firing is fed to above the conveyor belt 30 on a support plate (kiln furniture). At the same time the supporting arms 24 are moved away from one another to a distance such that on the lowering of the tie-bar 22 the supporting arms 24 can be guided past the rollers 16 on either side of the firing table arrangement, namely until the wheels 26 lie slightly below the plane of the support rollers 16.

Thereafter the supporting arms 24 are again moved towards one another until the wheels 26 lie slightly below the support rollers 16. Thereafter the tie-bar 22 is guided slightly upwards until the wheels 26, which are driven at this moment, transmit their rotating movement to the support rollers 16. This occurs due to the fact that a support roller 16 is picked up and guided between two adjacent wheels 26 in each case.

Although the support rollers 16 continue to maintain their position, they now rotate, so that the product for firing fed to above the conveyor belt 30 can be guided (on the kiln furniture) above the support rollers 16 up to the desired position on the plane 380. At this moment the tie-bar 22 is moved downwards again, so that the rotating movement of the support rollers 16 is interrupted and the product for firing has reached its final position on the plane 380.

In a similar manner further products for firing can then be guided onto the plane 380 until the latter is occupied.

Thereafter the supporting arms 24 are again moved away from one another and lowered onto the next plane **38*m***. Thereafter the loading operation is repeated as described.

The opposite procedure is observed for the unloading; in particular the wheels 26 are for this purpose naturally driven in the opposite direction.

The firing table arrangement here stands on a tunnel kiln car 40.

We claim:

1. Apparatus for loading and unloading a firing table arrangement with product for firing, wherein the firing table arrangement comprises on at least one horizontal plane a plurality of rollers having ends disposed at a distance from one another for picking up the product for firing, wherein 1.1 the apparatus aligned relative to the firing table arrangement, incorporates a supporting structure (20) with two horizontally projecting supporting arms (24) each of them running transversely relative to the rollers, laterally outside the firing table arrangement which are accommodated on the supporting structure (20) so as to be adjustable in height, said supporting arms having inner sides facing one another and a front end, 1.2 on the inner side of one supporting arm (24) are disposed drive means (26) which, after coupling to the rollers of the firing table arrangement, set them in a rotating movement, 1.3 on the inner side of the other supporting arm is disposed a device for the rotatable guiding of the rollers of the firing table arrangement.

2. Apparatus according to claim 1, in which the supporting arms (24) are in addition moveable along a horizontal plane.

3. Apparatus according to claim 1, in which the supporting arms (24) are moveable towards one another or away from one another.

4. Apparatus according to claim 1, in which the drive means (26) consist of a large number of driveable wheels which are disposed behind one another in a horizontal plane in the longitudinal direction of the respective supporting arm (24), and the spacing between two adjacent wheels (24) is proportioned for transmitting their rotating movement to a corresponding roller of the firing table arrangement.

5. Apparatus according to claim 1, in which the device for the rotatable guidance of the rollers consists of a large number of wheels which are disposed behind one another in a horizontal plane in the direction of the respective supporting arm, and the spacing between two adjacent wheels is proportioned for the rotatable guidance a corresponding roller of the firing table arrangement.

6. Apparatus according to claim 1, in which the drive means consist of a large number of rotatable organs which are so constructed that after placing on the ends of the rollers projecting freely over the firing table arrangement the organs transmit their rotating movement to said rollers.

7. Apparatus according to claim 6, in which the organs consist of discs.

8. Apparatus according to claim 6, in which the organs consist of bushes which can be attached to said ends of the rollers of the firing table arrangement with frictional connection.

9. Apparatus according to claim 6, in which the organs consist of pins which can be inserted into said ends of the rollers of the firing table arrangement with frictional connection.

10. Apparatus according to claim 1, in which the drive means (26) for the rollers are driveable by motor.

11. Apparatus according to claim 10, in which the drive means (26) for the rollers are driveable in common.

12. Apparatus according to claim 1, in which there is assigned to the supporting structure (20) a store (34) for picking up the product for firing in a plurality of horizontal planes (36).

13. Apparatus according to claim 1, with a height-adjustable feeding and removal device (30) for the product for firing, which is connected to the front end (**24*v***) of the supporting arms.

14. Apparatus according to claim 13, in which the feeding and removal device (30) consists of a conveyor belt.

15. Apparatus according to claim 1, in which the supporting arms (24) are moveable towards one another or away from one another, in which the drive means (26) for the rollers consist of a large number of driveable wheels which are disposed behind one another in a horizontal plane along the respective supporting arm (24), and the spacing between two adjacent wheels (24) is proportioned for transmitting their rotating movement to a corresponding roller of the firing table arrangement, in which the device for the rotatable guidance of the rollers consists of a large number of wheels which are disposed behind one another in a horizontal plane along the respective supporting arm, and the spacing between two adjacent wheels is proportioned for the rotatable guidance of a corresponding roller of the firing table arrangement, in which the drive means (26) for the rollers are driveable by motor, in which the drive means (26) for the rollers are driveable in common, in which there is assigned relative to the supporting structure (20) a store (34) for picking up the product for firing in a plurality of horizontal planes (36), with a height-adjustable feeding and removal device (30) for the product for firing, which is connected to the front end (**24*v*) of the supporting arms (24), and in which the feeding and removal device (30**) consists of a conveyor belt.

16. Apparatus for loading and unloading a firing table arrangement with product for firing, wherein the firing table arrangement comprises on at least one horizontal plane a plurality of rollers disposed at a distance from one another for picking up the product for firing, wherein 2.1 the apparatus aligned relative to the firing table arrangement incorporates a supporting structure (20) with two horizontally projecting supporting arms (24) each of them running traversely relative to the rollers, laterally outside the firing table arrangement which are accommodated on the supporting structure (20) so as to be adjustable in height, said supporting arms having inner sides facing one another, 2.2 on the inner side of each supporting arms (24) are disposed drive means (26) which, after coupling to the rollers of the firing table, set them in a rotating movement.

17. Apparatus according to claim 16, in which each supporting arm has a front end, in which the supporting arms (24) are moveable towards one another or away from one another, in which the drive means (26) for the rollers consist of a large number of driveable wheels which are disposed behind one another in a horizontal plane along the respective supporting arm (24), and the spacing between two adjacent wheels (24) is proportioned for transmitting their rotating movement to a corresponding roller of the firing table arrangement, in which the drive means (26) for the rollers are driveable by motor, in which the drive means (26) for the rollers are driveable in common, in which there is assigned relative to the supporting structure (20) a store (34) for picking up the product for firing in a plurality of horizontal planes (36), with a height-adjustable feeding and removal device (30) for the product for firing, which is connected to the front end (24*v*) of the supporting arms (24), and in which the feeding and removal device (30) consists of a conveyor belt.

18. Apparatus for loading and unloading a firing table arrangement with product for firing, wherein the firing table arrangement comprises on at least one horizontal plane, for picking up the product for firing, a plurality of bars disposed at a distance from one another and running parallel with or traverse to the loading and unloading direction of the product for firing, wherein 3.1 the apparatus aligned relative to the firing table arrangement, incorporates a supporting structure with at least two horizontally projecting supporting arms running transversely to the bars, which are accommodated on the supporting structure so as to be adjustable in height and in addition are movable horizontally below one horizontal plane of the firing table arrangement, 3.2 a plurality of driveable rollers which are adjustable in height perpendicular relative to the supporting arms and spaced one from the other are extending between the supporting arms.

19. Apparatus according to claim 18, in which a conveyor belt runs about the rollers.

20. Apparatus according to claim 18, in which each supporting arm has a front end, in which the supporting arms (24) are in addition movable along a horizontal plane, in which the drive means (26) for the rollers extending between the supporting arms (24) are driveable by motor, in which the drive means (26) for the rollers extending between the supporting arms are driveable in common, in which there is assigned relative to the supporting structure (20) a store (34) for picking up the product for firing in a plurality of horizontal planes (36), with a height-adjustable feeding and removal device (30) for the product for firing, which is connected to the front end (24*v*) of the supporting arms (24), in which the feeding and removal device (30) consists of a conveyor belt, and in which one or more conveyor belts run about the rollers.

* * * * *